US009256668B2

(12) United States Patent
Raichelgauz et al.

(10) Patent No.: US 9,256,668 B2
(45) Date of Patent: Feb. 9, 2016

(54) SYSTEM AND METHOD OF DETECTING COMMON PATTERNS WITHIN UNSTRUCTURED DATA ELEMENTS RETRIEVED FROM BIG DATA SOURCES

(71) Applicant: CORTICA, LTD., Ramat Gan (IL)

(72) Inventors: Igal Raichelgauz, Ramat Gan (IL); Karina Ordinaev, Ramat Gan (IL); Yehoshua Y. Zeevi, Haifa (IL)

(73) Assignee: Cortica, Ltd., Tel Aviv (IL)

( * ) Notice: Subject to any disclaimer, the term of this patent is extended or adjusted under 35 U.S.C. 154(b) by 0 days.

(21) Appl. No.: 14/013,740

(22) Filed: Aug. 29, 2013

(65) Prior Publication Data

US 2013/0346412 A1  Dec. 26, 2013

Related U.S. Application Data (63) Continuation-in-part of application No. 13/602,858, filed on Sep. 4, 2012, now Pat. No. 8,868,619, which is a continuation of application No. 12/603,123, filed on Oct. 21, 2009, now Pat. No. 8,266,185, which is a (Continued)

(30) Foreign Application Priority Data

| Oct. 26, 2005 | (IL) | ......................................... | 171577 |
| Jan. 29, 2006 | (IL) | ......................................... | 173409 |
| Aug. 21, 2007 | (IL) | ......................................... | 185414 |

(51) Int. Cl.
*G06F 17/30* (2006.01)

(52) U.S. Cl.
CPC ...... *G06F 17/30705* (2013.01); *G06F 17/3002* (2013.01)

(58) Field of Classification Search
CPC ................................................. G06F 17/30705
See application file for complete search history.

(56) References Cited

U.S. PATENT DOCUMENTS

| 4,972,363 | A | 11/1990 | Nguyen et al. |
| 5,940,821 | A | 8/1999 | Wical |
| 5,978,754 | A | 11/1999 | Kumano |
| 5,987,454 | A | 11/1999 | Hobbs |

(Continued)

FOREIGN PATENT DOCUMENTS

| WO | 02/31764 | 4/2002 |
| WO | 2007/049282 | 5/2007 |

OTHER PUBLICATIONS

Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005.

(Continued)

*Primary Examiner* — Grace Park
(74) *Attorney, Agent, or Firm* — M&B IP Analysts, LLC (57) ABSTRACT

A method for detection of common patterns within unstructured data elements. The method includes extracting a plurality of unstructured data elements retrieved from a plurality of big data sources; generating at least one signature for each of the plurality of unstructured data elements; identifying common patterns among the generated signatures; clustering the signatures identified to have common patterns; and correlating the generated clusters to identify associations between their respective identified common patterns.

19 Claims, 4 Drawing Sheets

Related U.S. Application Data continuation-in-part of application No. 12/084,150, which is a continuation of application No. PCT/IL2006/001235, filed on Oct. 26, 2006, now Pat. No. 8,655,801, said application No. 12/603,123 is a continuation-in-part of application No. 12/195,863, filed on Aug. 21, 2008, now Pat. No. 8,326,775, which is a continuation-in-part of application No. 12/084,150, said application No. 12/603,123 is a continuation of application No. 12/084,150, filed on Apr. 7, 2009, said application No. 12/603,123 is a continuation-in-part of application No. 12/348,888, filed on Jan. 5, 2009, which is a continuation-in-part of application No. 12/084,150, and a continuation-in-part of application No. 12/195,863, said application No. 12/603,123 is a continuation-in-part of application No. 12/538,495, filed on Aug. 10, 2009, now Pat. No. 8,312,031, which is a continuation-in-part of application No. 12/084,150, filed on Apr. 7, 2009, now Pat. No. 8,655,801, and a continuation-in-part of application No. 12/195,863, and a continuation-in-part of application No. 12/348,888.

(60) Provisional application No. 61/773,838, filed on Mar. 7, 2013.

(56) References Cited

U.S. PATENT DOCUMENTS

| | | | |
|---|---|---|---|
| 6,038,560 A | 3/2000 | Wical |
| 6,052,481 A | 4/2000 | Grajski et al. |
| 6,076,088 A | 6/2000 | Paik et al. |
| 6,122,628 A | 9/2000 | Castelli et al. |
| 6,240,423 B1 | 5/2001 | Hirata |
| 6,243,375 B1 | 6/2001 | Speicher |
| 6,363,373 B1 | 3/2002 | Steinkraus |
| 6,381,656 B1 | 4/2002 | Shankman |
| 6,422,617 B1 | 7/2002 | Fukumoto et al. |
| 6,493,692 B1 | 12/2002 | Kobayashi et al. |
| 6,493,705 B1 | 12/2002 | Kobayashi et al. |
| 6,523,022 B1 | 2/2003 | Hobbs |
| 6,526,400 B1 | 2/2003 | Takata et al. |
| 6,560,597 B1 | 5/2003 | Dhillon et al. |
| 6,601,060 B1 | 7/2003 | Tomaru |
| 6,611,628 B1 | 8/2003 | Sekiguchi et al. |
| 6,611,837 B2 | 8/2003 | Schreiber |
| 6,618,711 B1 | 9/2003 | Ananth |
| 6,643,620 B1 | 11/2003 | Contolini et al. |
| 6,643,643 B1 | 11/2003 | Lee et al. |
| 6,675,159 B1 | 1/2004 | Lin et al. |
| 6,728,706 B2 | 4/2004 | Aggarwal et al. |
| 6,754,435 B2 | 6/2004 | Kim |
| 6,763,519 B1 | 7/2004 | McColl et al. |
| 6,804,356 B1 | 10/2004 | Krishnamachari |
| 6,819,797 B1 | 11/2004 | Smith et al. |
| 6,836,776 B2 | 12/2004 | Schreiber |
| 6,901,207 B1 | 5/2005 | Watkins |
| 6,970,881 B1 | 11/2005 | Mohan et al. |
| 6,978,264 B2 | 12/2005 | Chandrasekar et al. |
| 7,006,689 B2 | 2/2006 | Kasutani |
| 7,013,051 B2 | 3/2006 | Sekiguchi et al. |
| 7,124,149 B2 | 10/2006 | Smith et al. |
| 7,260,564 B1 | 8/2007 | Lynn et al. |
| 7,296,012 B2 | 11/2007 | Ohashi |
| 7,302,117 B2 | 11/2007 | Sekiguchi et al. |
| 7,313,805 B1 | 12/2007 | Rosin et al. |
| 7,346,629 B2 | 3/2008 | Kapur et al. |
| 7,392,238 B1 | 6/2008 | Zhou et al. |
| 7,406,459 B2 | 7/2008 | Chen et al. |
| 7,450,740 B2 | 11/2008 | Shah et al. |
| 7,523,102 B2 | 4/2009 | Bjarnestam et al. |
| 7,526,607 B1 | 4/2009 | Singh et al. |
| 7,536,384 B2 | 5/2009 | Venkataraman et al. |
| 7,542,969 B1 | 6/2009 | Rappaport et al. |
| 7,548,910 B1 | 6/2009 | Chu et al. |
| 7,555,477 B2 | 6/2009 | Bayley et al. |
| 7,555,478 B2 | 6/2009 | Bayley et al. |
| 7,562,076 B2 | 7/2009 | Kapur |
| 7,574,436 B2 | 8/2009 | Kapur et al. |
| 7,574,668 B2 | 8/2009 | Nunez et al. |
| 7,694,318 B2 | 4/2010 | Eldering et al. |
| 7,920,894 B2 | 4/2011 | Wyler |
| 7,921,107 B2 | 4/2011 | Chang et al. |
| 7,974,994 B2 | 7/2011 | Li et al. |
| 7,987,194 B1 | 7/2011 | Walker et al. |
| 7,991,715 B2 | 8/2011 | Schiff et al. |
| 8,000,655 B2 | 8/2011 | Wang et al. |
| 8,098,934 B2 | 1/2012 | Vincent et al. |
| 8,260,764 B1 | 9/2012 | Gruber |
| 8,266,148 B2 | 9/2012 | Guha et al. |
| 8,266,185 B2 | 9/2012 | Raichelgauz et al. |
| 8,312,031 B2 | 11/2012 | Raichelgauz et al. |
| 8,316,005 B2 | 11/2012 | Moore |
| 8,396,892 B2 | 3/2013 | Loftus et al. |
| 8,396,894 B2 | 3/2013 | Jacobson et al. |
| 8,504,553 B2 | 8/2013 | Vailaya et al. |
| 8,677,377 B2 | 3/2014 | Cheyer et al. |
| 8,682,667 B2 | 3/2014 | Haughay |
| 8,688,446 B2 | 4/2014 | Yanagihara |
| 8,706,503 B2 | 4/2014 | Cheyer et al. |
| 8,775,442 B2 | 7/2014 | Moore et al. |
| 8,868,619 B2 | 10/2014 | Raichelgauz et al. |
| 8,898,568 B2 | 11/2014 | Bull et al. |
| 9,031,999 B2 | 5/2015 | Raichelgauz et al. |
| 2001/0019633 A1 | 9/2001 | Tenze et al. |
| 2001/0056427 A1 | 12/2001 | Yoon et al. |
| 2002/0107827 A1 | 8/2002 | Benitez-Jimenez et al. |
| 2002/0123928 A1 | 9/2002 | Eldering et al. |
| 2002/0178410 A1 | 11/2002 | Haitsma et al. |
| 2003/0028660 A1 | 2/2003 | Igawa et al. |
| 2003/0041047 A1 | 2/2003 | Chang et al. |
| 2003/0078766 A1 | 4/2003 | Appelt et al. |
| 2003/0191764 A1 | 10/2003 | Richards |
| 2004/0068510 A1 | 4/2004 | Hayes et al. |
| 2004/0107181 A1 | 6/2004 | Rodden |
| 2004/0111465 A1 | 6/2004 | Chuang et al. |
| 2004/0128142 A1 | 7/2004 | Whitham |
| 2004/0128511 A1 | 7/2004 | Sun et al. |
| 2004/0153426 A1 | 8/2004 | Nugent |
| 2004/0249779 A1 | 12/2004 | Nauck et al. |
| 2005/0177372 A1 | 8/2005 | Wang et al. |
| 2006/0020860 A1 | 1/2006 | Tardif et al. |
| 2006/0026203 A1 | 2/2006 | Tan et al. |
| 2006/0031216 A1 | 2/2006 | Semple et al. |
| 2006/0064037 A1 | 3/2006 | Shalon et al. |
| 2006/0153296 A1 | 7/2006 | Deng |
| 2006/0173688 A1 | 8/2006 | Whitham |
| 2006/0204035 A1 | 9/2006 | Guo et al. |
| 2006/0236343 A1 | 10/2006 | Chang |
| 2006/0242139 A1 | 10/2006 | Butterfield et al. |
| 2006/0242554 A1 | 10/2006 | Gerace et al. |
| 2006/0248558 A1 | 11/2006 | Barton et al. |
| 2006/0253423 A1 | 11/2006 | McLane et al. |
| 2007/0009159 A1 | 1/2007 | Fan |
| 2007/0011151 A1 | 1/2007 | Hagar et al. |
| 2007/0038608 A1 | 2/2007 | Chen |
| 2007/0074147 A1 | 3/2007 | Wold |
| 2007/0130112 A1 | 6/2007 | Lin |
| 2007/0130159 A1 | 6/2007 | Gulli et al. |
| 2007/0174320 A1 | 7/2007 | Chou |
| 2007/0195987 A1 | 8/2007 | Rhoads |
| 2007/0220573 A1 | 9/2007 | Chiussi et al. |
| 2007/0244902 A1 | 10/2007 | Seide et al. |
| 2007/0253594 A1 | 11/2007 | Lu et al. |
| 2007/0268309 A1 | 11/2007 | Tanigawa et al. |
| 2007/0282826 A1 | 12/2007 | Hoeber et al. |
| 2007/0294295 A1 | 12/2007 | Finkelstein et al. |
| 2008/0049629 A1 | 2/2008 | Morrill |
| 2008/0072256 A1 | 3/2008 | Boicey et al. |
| 2008/0163288 A1 | 7/2008 | Ghosal et al. |
| 2008/0172615 A1 | 7/2008 | Igelman et al. |

(56) References Cited

U.S. PATENT DOCUMENTS

| | | | |
|---|---|---|---|
| 2008/0201299 A1 | 8/2008 | Lehikoinen et al. | |
| 2008/0204706 A1 | 8/2008 | Magne et al. | |
| 2008/0270373 A1 | 10/2008 | Oostveen et al. | |
| 2008/0313140 A1* | 12/2008 | Pereira et al. | 707/2 |
| 2009/0013414 A1 | 1/2009 | Washington et al. | |
| 2009/0037408 A1 | 2/2009 | Rodgers | |
| 2009/0089587 A1 | 4/2009 | Brunk et al. | |
| 2009/0119157 A1 | 5/2009 | Dulepet | |
| 2009/0172030 A1 | 7/2009 | Schiff et al. | |
| 2009/0175538 A1 | 7/2009 | Bronstein et al. | |
| 2009/0245603 A1 | 10/2009 | Koruga et al. | |
| 2009/0253583 A1 | 10/2009 | Yoganathan | |
| 2009/0277322 A1 | 11/2009 | Cai et al. | |
| 2010/0082684 A1 | 4/2010 | Churchill et al. | |
| 2010/0104184 A1 | 4/2010 | Bronstein et al. | |
| 2010/0268524 A1 | 10/2010 | Nath et al. | |
| 2010/0318493 A1 | 12/2010 | Wessling | |
| 2010/0322522 A1 | 12/2010 | Wang et al. | |
| 2011/0202848 A1 | 8/2011 | Ismalon | |
| 2011/0251896 A1 | 10/2011 | Impollonia et al. | |
| 2011/0313856 A1 | 12/2011 | Cohen et al. | |
| 2012/0167133 A1 | 6/2012 | Carroll et al. | |
| 2012/0197895 A1 | 8/2012 | Isaacson et al. | |
| 2012/0330869 A1 | 12/2012 | Durham | |
| 2013/0173257 A1 | 7/2013 | Rose et al. | |
| 2013/0179514 A1 | 7/2013 | Arora et al. | |
| 2013/0197938 A1 | 8/2013 | Bayouk et al. | |
| 2013/0232157 A1 | 9/2013 | Kamel | |
| 2013/0325550 A1 | 12/2013 | Varghese et al. | |
| 2013/0332951 A1 | 12/2013 | Gharaat et al. | |
| 2014/0019264 A1 | 1/2014 | Wachman et al. | |

OTHER PUBLICATIONS

Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.
Cernansky et al., "Feed-forward Echo State Networks"; Proceedings of International Joint Conference on Neural Networks, Montreal, Canada, Jul. 31-Aug. 4, 2005.
Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.
Freisleben et al., "Recognition of Fractal Images Using a Neural Network", Lecture Notes in Computer Science, 1993, vol. 6861, 1993, pp. 631-637.
Ware et al., "Locating and Identifying Components in a Robot's Workspace using a Hybrid Computer Architecture"; Proceedings of the 1995 IEEE International Symposium on Intelligent Control, Aug. 27-29, 1995, pp. 139-144.
Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002.
Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.
Howlett et al., "A Multi-Computer Neural Network Architecture in a Virtual Sensor System Application", International Journal of Knowledge-based Intelligent Engineering Systems, 4 (2). pp. 86-93, 133N 1327-2314; first submitted Nov. 30, 1999; revised version submitted Mar. 10, 2000.
Ortiz-Boyer et al., "CIXL2: A Crossover Operator for Evolutionary Algorithms Based on Population Features", Journal of Artificial Intelligence Research 24 (2005) 1-48 Submitted Nov. 2004; published Jul. 2005.
Lin, C.; Chang, S.: "Generating Robust Digital Signature for Image/Video Authentication", Multimedia and Security Workshop at ACM Mutlimedia '98; Bristol, U.K., Sep. 1998; pp. 49-54.

Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.
Maass, W. et al.: "Computational Models for Generic Cortical Microcircuits", Institute for Theoretical Computer Science, Technische Universitaet Graz, Graz, Austria, published Jun. 10, 2003.
Raichelgauz, I. et al.: "Co-evolutionary Learning in Liquid Architectures", Lecture Notes in Computer Science, [Online] vol. 3512, Jun. 21, 2005, pp. 241-248, XP019010280 Springer Berlin / Heidelberg ISSN: 1611-3349 ISBN: 978-3-540-26208-4.
Jaeger, H.: "The "echo state" approach to analysing and training recurrent neural networks", GMD Report, No. 148, 2001, pp. 1-43, XP002466251. German National Research Center for Information Technology.
Verstraeten et al.: "Isolated word recognition with the Liquid State Machine: a case study", Information Processing Letters, Amsterdam, NL, vol. 95, No. 6, Sep. 30, 2005, pp. 521-528, XP005028093 ISSN: 0020-0190.
Zeevi, Y. et al.: "Natural Signal Classification by Neural Cliques and Phase-Locked Attractors", IEEE World Congress on Computational Intelligence, IJCNN2006, Vancouver, Canada, Jul. 2006, XP002466252.
Natsclager, T. et al.: "The "liquid computer": A novel strategy for real-time computing on time series", Special Issue on Foundations of Information Processing of Telematik, vol. 8, No. 1, 2002, pp. 39-43, XP002466253.
Morad, T.Y. et al.: "Performance, Power Efficiency and Scalability of Asymmetric Cluster Chip Multiprocessors", Computer Architecture Letters, vol. 4, Jul. 4, 2005, pp. 1-4, XP002466254.
Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.
Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.
IPO Examination Report under Section 18(3) for corresponding UK application No. GB1001219.3, dated Sep. 12, 2011.
International Search Report for the corresponding International Patent Application PCT/IL2006/001235; Date of Mailing: Nov. 2, 2008.
International Search Authority: "Written Opinion of the International Searching Authority" (PCT Rule 43bis.1) including International Search Report for International Patent Application No. PCT/US2008/073852; Date of Mailing: Jan. 28, 2009.
International Search Authority: International Preliminary Report on Patentability (Chapter I of the Patent Cooperation Treaty) including "Written Opinion of the International Searching Authority" (PCT Rule 43bis. 1) for the corresponding International Patent Application No. PCT/IL2006/001235; Date of Issuance: Jul. 28, 2009.
Foote, Jonathan, et al. "Content-Based Retrieval of Music and Audio", 1997 Institute of Systems Science, National University of Singapore, Singapore (Abstract).
Ribert et al. "An Incremental Hierarchical Clustering", Visicon Interface 1999, pp. 586-591.
Guo et al, "AdOn: An Intelligent Overlay Video Advertising System", SIGIR, Boston, Massachusetts, Jul. 19-23, 2009.
Mei, et al., "Contextual In-Image Advertising", Microsoft Research Asia, pp. 439-448, 2008.
Mei, et al., "VideoSense—Towards Effective Online Video Advertising", Microsoft Research Asia, pp. 1075-1084, 2007.
Semizarov et al. "Specificity of Short Interfering RNA Determined through Gene Expression Signatures", PNAS, 2003, pp. 6347-6352.
Cococcioni, et al, "Automatic Diagnosis of Defects of Rolling Element Bearings Based on Computational Intelligence Techniques", University of Pisa, Pisa, Italy, 2009.
Emami, et al, "Role of Spatiotemporal Oriented Energy Features for Robust Visual Tracking in Video Surveillance, University of Queensland", St. Lucia, Australia, 2012.

(56) References Cited

OTHER PUBLICATIONS

Mahdhaoui, et al, "Emotional Speech Characterization Based on Multi-Features Fusion for Face-to-Face Interaction", Universite Pierre et Marie Curie, Paris, France, 2009.

Marti, et al, "Real Time Speaker Localization and Detection System for Camera Steering in Multiparticipant Videoconferencing Environments", Universidad Politecnica de Valencia, Spain, 2011.

Boari et al, "Adaptive Routing for Dynamic Applications in Massively Parallel Architectures", 1995 IEEE, Spring 1995.

Garcia, "Solving the Weighted Region Least Cost Path Problem Using Transputers", Naval Postgraduate School, Monterey, California, Dec. 1989.

Nagy et al, "A Transputer, Based, Flexible, Real-Time Control System for Robotic Manipulators", UKACC International Conference on Control '96, Sep. 2-5, 1996, Conference 1996, Conference Publication No. 427, IEE 1996.

Scheper, et al. "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.

Theodoropoulos et al, "Simulating Asynchronous Architectures on Transputer Networks", Proceedings of the Fourth Euromicro Workshop on Parallel and Distributed Processing, 1996. PDP '96.

Nang et al. "A Signature for Content-based Image Retrieval Using a Geometrical Transform", ACM 1998, pp. 229-234.

* cited by examiner

SYSTEM AND METHOD OF DETECTING COMMON PATTERNS WITHIN UNSTRUCTURED DATA ELEMENTS RETRIEVED FROM BIG DATA SOURCES

CROSS-REFERENCE TO RELATED APPLICATIONS

This application claims the benefit of U.S. provisional application 61/773,838 filed on Mar. 7, 2013. This application is a continuation-in-part (CIP) of U.S. patent application Ser. No. 13/602,858 filed Sep. 4, 2012, which is a continuation of U.S. patent application Ser. No. 12/603,123, filed on Oct. 21, 2009, now issued as U.S. Pat. No. 8,266,185, which is a continuation-in-part of:

(1) U.S. patent application Ser. No. 12/084,150 having a filing date of Apr. 7, 2009, now pending, which is the National Stage of International Application No. PCT/IL2006/001235, filed on Oct. 26, 2006, which claims foreign priority from Israeli Application No. 171577 filed on Oct. 26, 2005 and Israeli Application No. 173409 filed on 29 Jan. 2006;

(2) U.S. patent application Ser. No. 12/195,863, filed Aug. 21, 2008, now pending, which claims priority under 35 USC 119 from Israeli Application No. 185414, filed on Aug. 21, 2007, and which is also a continuation-in-part of the above-referenced U.S. patent application Ser. No. 12/084,150;

(3) U.S. patent application Ser. No. 12/348,888, filed Jan. 5, 2009, now pending, which is a CIP of U.S. patent application Ser. No. 12/084,150, having a filing date of Apr. 7, 2009 and U.S. patent application Ser. No. 12/195,863 filed on Aug. 21, 2008; and (4) U.S. patent application Ser. No. 12/538,495, filed Aug. 10, 2009, now pending, which is a CIP of U.S. patent application Ser. No. 12/084,150 having a filing date of Apr. 7, 2009, U.S. patent application Ser. No. 12/195,863, filed on Aug. 21, 2008; and U.S. patent application Ser. No. 12/348, 888, filed Jan. 5, 2009.

All of the applications referenced above are herein incorporated by reference for all that they contain.

TECHNICAL FIELD

The present invention relates generally to the analysis of unstructured data, and more specifically to a system for identifying common patterns within unstructured data elements.

BACKGROUND

With the abundance of unstructured data made available through various means in general and the Internet in particular, there is also a need to provide effective ways of analyzing such data. Unstructured data analysis is a challenging task, as it requires processing of big-data. Big data typically refers to a collection of data sets that are large and complex and cannot be analyzed using on-hand database management tools or traditional data processing applications.

Several prior art solutions can be used to search through big data sources. As a result of the search, relevant data elements may be extracted from such big data sources. However, a problem may occur while trying to search for additional data that may be useful, for example, data containing similar characteristics to the characteristics of the extracted data. Typically, the complexity of the data while analyzing the characteristics of big data, leads to inefficient identification of common patterns. Furthermore, the search as known today may be inefficient because of lack of correlation between data elements extracted from big data sources.

It would be therefore advantageous to provide an efficient solution to analyze big data. It would be further advantageous if such solution would enable correlating between common patterns while analyzing the big data.

SUMMARY

Certain embodiments disclosed herein include a method for detection of common patterns within unstructured data elements. The method includes extracting a plurality of unstructured data elements retrieved from a plurality of big data sources; generating at least one signature for each of the plurality of unstructured data elements; identifying common patterns among the generated signatures; clustering the signatures identified to have common patterns; and correlating the generated clusters to identify associations between their respective identified common patterns.

Certain embodiments disclosed herein also include a system for analyzing unstructured data. The system comprises a network interface for allowing connectivity to a plurality of big data sources; a processor; and a memory connected to the processor, the memory contains instructions that when executed by the processor, configure the system to: extract a plurality of unstructured data elements retrieved from a plurality of big data sources; cause generation of at least one signature for each of the plurality of unstructured data elements; identify common patterns among the generated signatures; cluster the signatures identified to have common patterns; and correlate the generated clusters to identify associations between their respective identified common patterns.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain exemplary embodiments disclosed herein allow determining a correlation between unstructured data elements extracted from big data sources comprising unstructured data. The correlation refers to any of a broad class of statistical relationships involving at least two sets of data. The embodiments disclosed herein determine the nature of the relationship between the unstructured data elements. One or more common patterns are identified within the unstructured data elements respective of a signature analysis. Unstructured data refers to pieces of data that do not have a predefined structure and are usually not organized in a consistent and predictable manner.

Typically, the data tends to be recorded in a free text form with little or no metadata codified into fields. Unstructured data may be, for example, a multimedia content, a book, a document, metadata, health records, audio, video, analog data, files, unstructured text, web page, a combination thereof, a portion thereof, and so on. The method described herein determines an association of the unstructured data elements in space and/or time respective of the big data sources.

Figure 1:
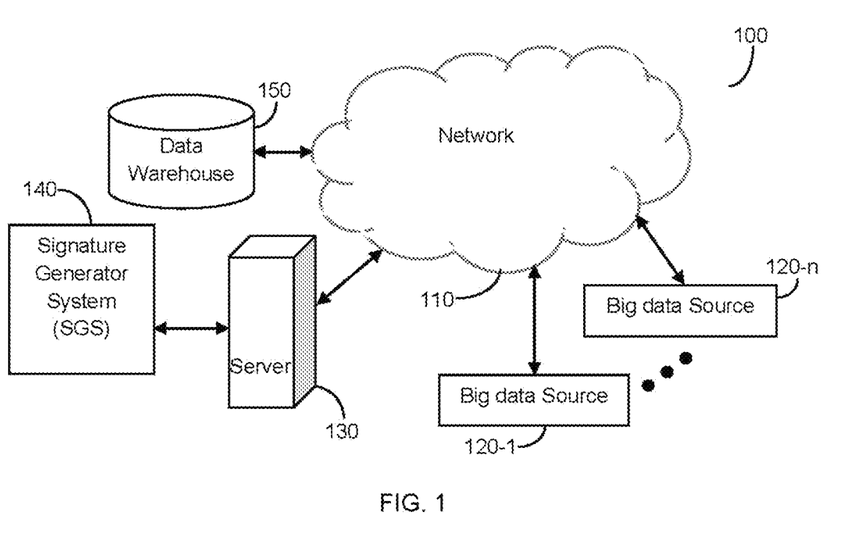
FIG. 1 is a schematic block diagram of a network system for analyzing unstructured data according to one embodiment.

FIG. 1 shows an exemplary and non-limiting schematic diagram of a network system 100 utilized for describing the various embodiments for analyzing multimedia content and determines common patterns of unstructured data elements extracted from big data sources. A network 110 is used to communicate between different parts of the system 100. The network 110 may be the Internet, the world-wide-web (WWW), a local area network (LAN), a wide area network (WAN), a metro area network (MAN), and other networks for enabling communication between the elements of the system 100.

A big data analyzer, for example, the server 130 is connected to the network 110. The server 130 is configured to correlate between unstructured data elements extracted from big data sources comprising unstructured data as described in detail below. The server 130 typically comprises a processing unit, such as a processor (not shown) that is communicatively connected to a memory. The memory contains instructions that are executed by the processor. The server 130 also includes an interface (not shown) to the network 110.

In one embodiment, a database such as, a data warehouse 150 is connected to the server 130 (either directly or through the network 110). The server 130 is configured to store in the data warehouse 150 information identified and/or generated by the server 130 for further use. Such information may include, signatures generated for the unstructured data elements, common patterns identified between the unstructured data elements, common concepts identified between the common patterns, and so on, as described in greater detail with respect of FIG. 2.

Further connected to the network 110 are a plurality of big data sources 120-1 through 120-*n*, each of which may contain, store, or generate unstructured data. The big data sources 120-1 through 120-*n* are accessible by the server 130 through the network 110. The system 100 also includes a signature generator system (SGS) 140. In one embodiment, the SGS 140 is connected to the server 130. The server 130 is configured to receive and serve the unstructured data elements. Moreover, the server 130 is configured to cause the SGS 140 to generate the signatures respective of the unstructured data elements. Each signature is generated for each element of the unstructured data.

The SGS 140 typically comprises a processing unit and a memory maintaining executable instructions. Such instructions may be executed by the processor. The process for generating the signatures for the unstructured data elements, is explained in more detail herein below with respect to FIGS. 3 and 4.

According to the various exemplary embodiments, the unstructured data may include multimedia content elements. A multimedia content element may be, for example, an image, a graphic, a video stream, a video clip, an audio stream, an audio clip, a video frame, a photograph, and an image of signals (e.g., spectrograms, phasograms, scalograms, etc.), and/or combinations thereof and portions thereof.

The server 130 is configured to extract unstructured data elements from at least one big data source 120 and provide such elements to the SGS 140. The SGS 140 is further configured to generate at least one signature for each extracted unstructured data element. The generated signature(s) may be robust to noise and distortion as discussed below with respect to FIGS. 3 and 4. Then, using the generated signature(s), the server 130 is configured to search for common patterns through the signatures. Upon identification of one or more common patterns through the signatures, the server 130 is configured to determine the correlation between the unstructured data elements and the associations thereof.

In one embodiment, the signatures generated for more than one unstructured data element are clustered. The clustered signatures are used to search for a common concept. The concept is a collection of signatures representing elements of the unstructured data and metadata describing the concept. As a non-limiting example, a 'Superman concept' is a signature reduced cluster of signatures describing elements (such as multimedia elements) related to, e.g., a Superman cartoon: a set of metadata representing proving textual representation of the Superman concept. Techniques for generating concepts and concept structures are also described in the co-pending U.S. patent application Ser. No. 12/603,123 (hereinafter the '123 Application) to Raichelgauz et al., which is assigned to common assignee, and is incorporated hereby by reference for all that it contains.

Figure 2:
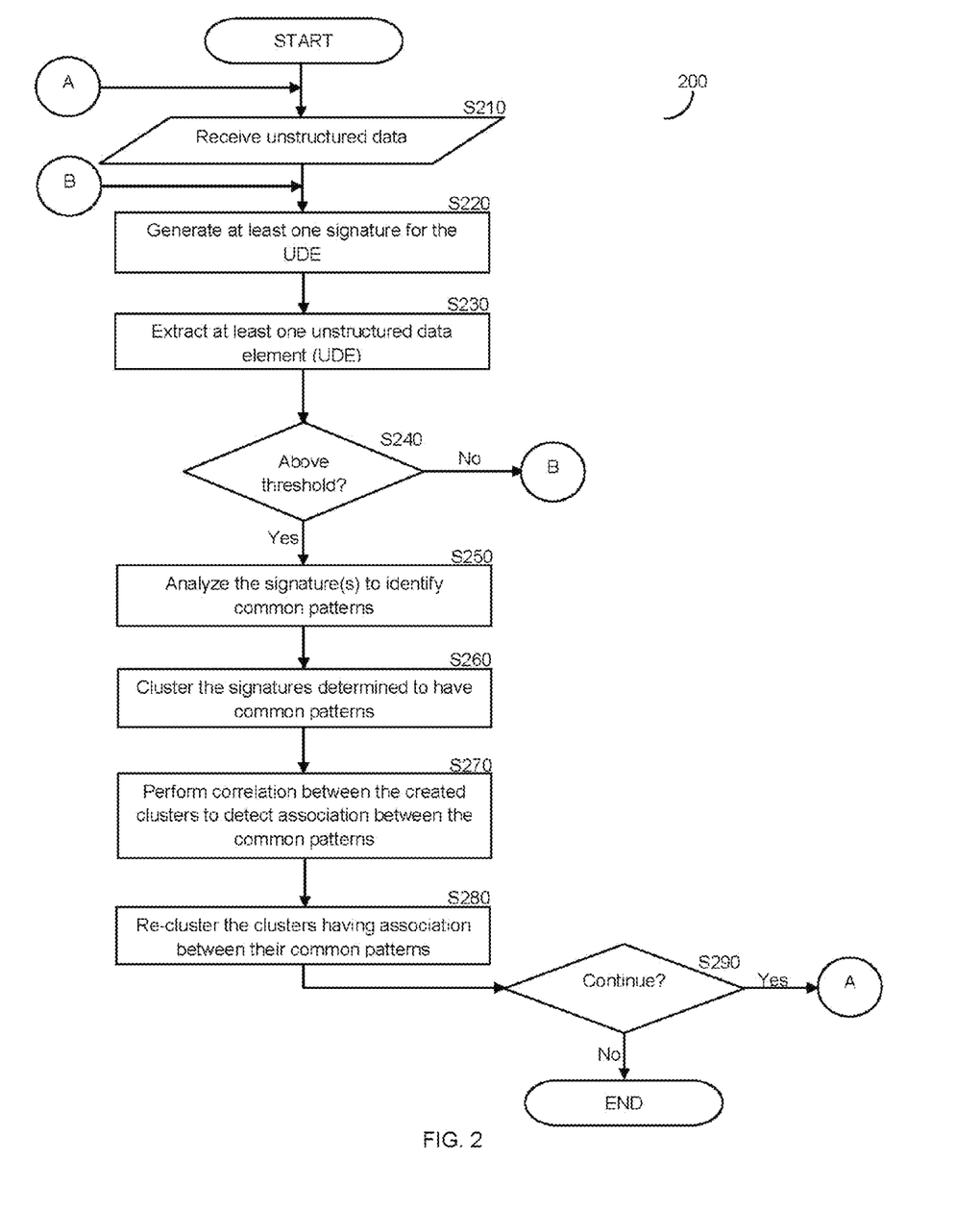
FIG. 2 is a flowchart describing the identification of common patterns within unstructured data elements retrieved from big data sources according to one embodiment.

FIG. 2 depicts an exemplary and non-limiting flowchart 200 describing a method of detection of common patterns within unstructured data elements retrieved from big data sources according to one embodiment. In an embodiment, the process discussed with reference to FIG. 2 is performed by the server 130 when the signatures are generated by means of the SGG 140.

In S210, unstructured data is received or retrieved from a plurality of big data sources, e.g. sources 120-1, 120-*n*. The sources may be classified by the data contained therein. For example, big data sources 120-1, 120-*n* may be related to all images found on the Internet, diagnostic information of a large group of patients, sales information of a large group of retail stores, and so on. As noted above, the unstructured data may be, for example, a multimedia content, a book, a document, metadata, health records, audio, video, analog data, files, unstructured text, web pages, a combination thereof, a portion thereof, and so on. In one embodiment, the processing is separately performed on the unstructured data retrieved/received from big data sources having the same classification. For example, all the images in the Internet would be processed separately from e.g. medical records.

In S220, unstructured data elements are extracted from the data collected from the big data sources, e.g. sources 120-1, 120-*n*. In one embodiment, the extracted elements are of specific interest, or otherwise of higher interest than other elements comprised in the collected unstructured data. As an example, a product's attributes and the sales volume of the product may be of interest. As another example, a disease type and its characteristics may be of higher interest than the patients' names. In addition, certain keywords may be of specific interest. As yet another example, portions of a multimedia element (e.g., a picture) having entropy level over a predefined threshold may be of more interest than other portions. In one non-limiting embodiment, S220 includes searching patterns or patches in the unstructured data, and extracting such identified patterns or patches. Typically, a patch of an image is defined by, for example, its size, scale, location and orientation. A video/audio patch may be a 1% of the total length of video/audio clip.

In S230, at least one signature for each extracted unstructured data element is generated. In one embodiment, each of the at least one signature is robust to noise and/or distortion and is generated by the SGS 140 as described below. In S240, it is checked if the number of extracted unstructured data elements are above a predefined threshold, i.e., if there is sufficient information for the processing, and if so, execution continues with S250; otherwise, execution continues with S220.

In S250, the generated signatures are analyzed to identify common patterns among the generated signatures. In one embodiment, a process of inter-matching is performed on the generated signatures. In an exemplary embodiment, this process includes matching signatures of all the extracted elements to each other. Each match of two signatures is assigned with a matching score being compared to a preconfigured threshold. When the matching score exceeds the preconfigured threshold, the two signatures are determined to have common pattern.

In S260, the signatures determined to have common patterns are clustered. In an embodiment, the clustering of the signatures performed is discussed in detail in the co-pending U.S. patent application Ser. No. 12/507,489, entitled "Unsupervised Clustering of Multimedia Data Using a Large-Scale Matching System," filed Jul. 22, 2009, assigned to common assignee, and which is hereby incorporated for all that it contains. It should be noted that S250 and S260 can result in a plurality of different clusters. As noted above, a cluster may include a textual metadata.

In S270, a correlation between the created clusters is performed to detect association between common patterns identified in the respective clusters. For example, if the common pattern of cluster A is 'red roses' and the common pattern of cluster B is 'Valentine's Day', then the correlation would detect any association and/or relationship between 'red roses' and 'Valentine's Day'. In one embodiment, a preconfigured threshold level is used to determine if there is an association between at least two clusters of the created clusters. This preconfigured threshold defines at least a number of signatures to be found in two or more correlated-clusters in order to determine that there is an association between the clusters. The correlation can be performed between each two different clusters of the created clusters.

In S280, a concept structure (or concept) is generated by re-clustering two or more clusters determined to have some sort of association between their patterns. In one embodiment, S280 may also include a process for reduction of the number of signatures in the re-clustered cluster and adding of the respective metadata to the reduced clusters to form a concept structure. In S280, the generated signatures, the concept, the clusters, and the identified common patterns may be stored in a data warehouse 150 for further use. In S290, it is checked whether additional unstructured data is received or retrieved, and if so, execution continues with S210; otherwise, execution terminates.

As a non-limiting example, several sales reports of worldwide retail chain stores are received by the server 130. The reports are analyzed and signatures are generated respective of each element within the reports. An element within the reports may be, for example, a certain product, or a certain product together with the quantity sold. Respective of the generated signatures, common patterns are identified, and then clustered as described above. For example, a first common pattern of a first cluster of signatures indicates that every certain date a significant amount of products which are packed in red packages are being sold. A second common pattern of second cluster of signatures indicates that an extensive amount of jewelry is sold in February. A third common pattern of a third cluster of signatures indicates an increase in sales of alcoholic beverages on the eve of February $14^{th}$. Upon correlating between the plurality of clusters, consumption habits can be determined with respect to Valentine's Day. By analyzing the common patterns of the sales report, the server 130 enables determination of a common concept related to the plurality of common patterns. In this case, the common concept may be "during Valentine's Day people tend to spend more money."

Figure 3:
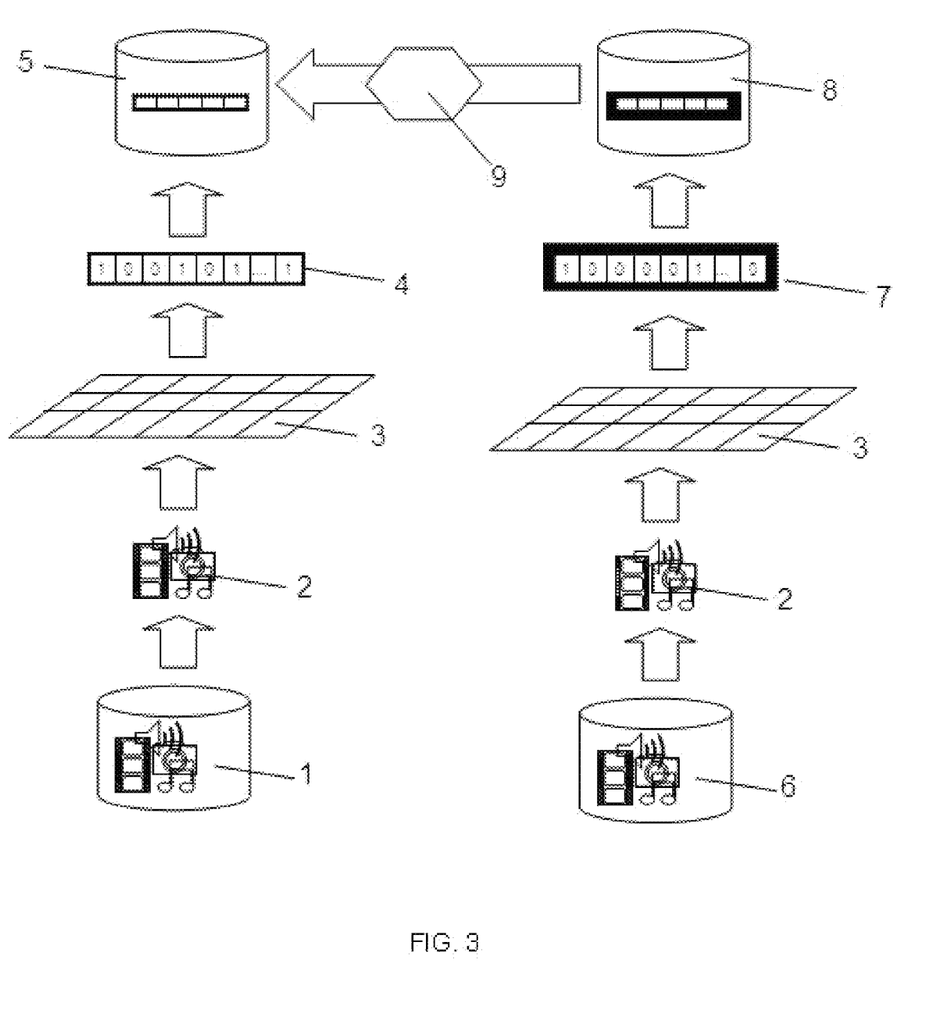
FIG. 3 is a block diagram depicting the basic flow of information in the signature generator system.
Figure 4:
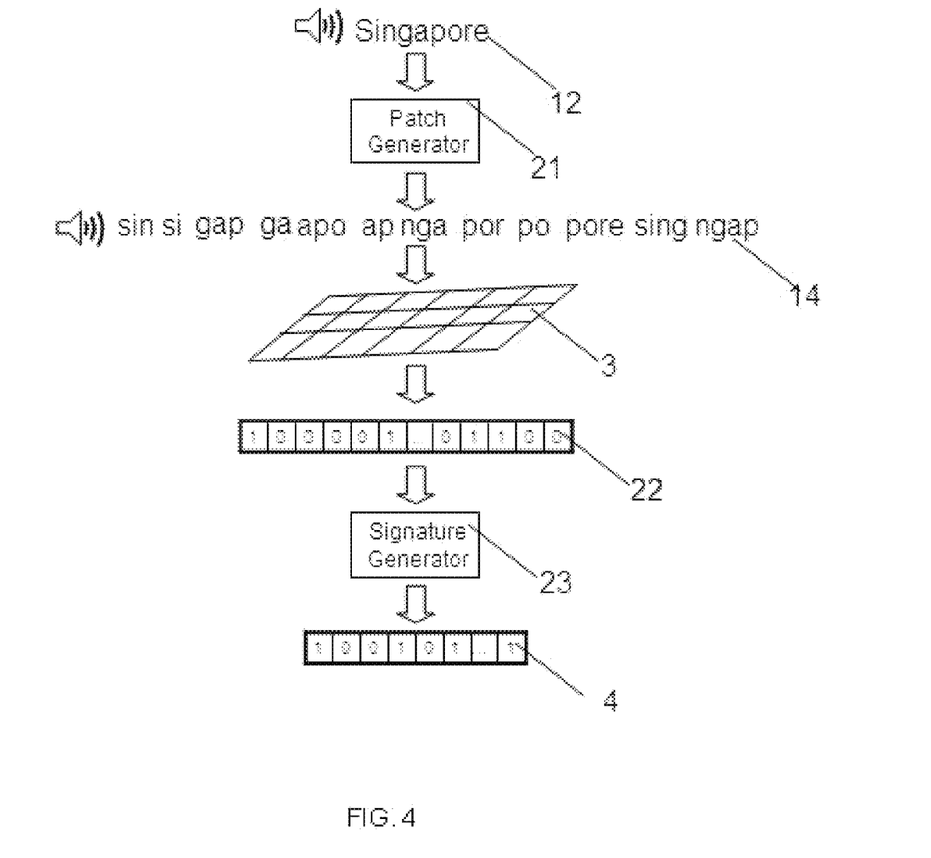
FIG. 4 is a diagram showing the flow of patches generation, response vector generation, and signature generation in a large-scale speech-to-text system.

FIGS. 3 and 4 illustrate the generation of signatures for the multimedia content elements by the SGS 140 according to one embodiment. An exemplary high-level description of the process for large scale matching is depicted in FIG. 3. In this example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Finally, Target Robust Signatures and/or Signatures are effectively matched, by a matching algorithm 9, to Master Robust Signatures and/or Signatures database to find all matches between the two databases.

To demonstrate an example of signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing the dynamics in-between the frames.

The Signatures' generation process will now be described with reference to FIG. 4. The first step in the process of signatures generation from a given speech-segment is to breakdown the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the server 130 and SGS 140. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3 a frame "i" is injected into all the Cores 3. Then, Cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $C_i=\{n_i\}$ ($1 \le i \le L$) may consist of a single leaky integrate-to-threshold unit (LTU) node or more nodes. The node $n_i$ equations are:

$$V_i = \sum_j w_{ij} k_j$$

$$n_i = \square (V_i - Th_x)$$

where, $\square$ is a Heaviside step function; $w_{ij}$ is a coupling node unit (CNU) between node i and image component j (for example, grayscale value of a certain pixel j); $k_j$ is an image component 'j' (for example, grayscale value of a certain pixel j); Thx is a constant Threshold value, where x is 'S' for Signature and 'RS' for Robust Signature; and Vi is a Coupling Node Value.

The Threshold values Thx are set differently for Signature generation and for Robust Signature generation. For example, for a certain distribution of Vi values (for the set of nodes), the thresholds for Signature ($Th_S$) and Robust Signature ($Th_{RS}$) are set apart, after optimization, according to at least one or more of the following criteria:

1: For:

$$V_i > Th_{RS}$$

$$1-p(V > Th_S)-1-(1-\epsilon)^l \ll 1$$

i.e., given that lnodes (cores) constitute a Robust Signature of a certain image I, the probability that not all of these I nodes will belong to the Signature of same, but noisy image, $\tilde{~}$ is sufficiently low (according to a system's specified accuracy).

2:

$$p(V_i > Th_{RS}) \approx l/L$$

i.e., approximately l out of the total L nodes can be found to generate a Robust Signature according to the above definition.

3: Both Robust Signature and Signature are generated for certain frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need of comparison to the original data. Detailed description of the Signature generation can be found U.S. Pat. Nos. 8,326,775 and 8,312,031, assigned to common assignee, which are hereby incorporated by reference for all the useful information they contain.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications. Detailed description of the Computational Core generation, the computational architecture, and the process for configuring such cores is discussed in more detail in the co-pending U.S. patent application Ser. No. 12/084,150 referenced above.

The various embodiments disclosed herein can be implemented as hardware, firmware, software, or any combination thereof. Moreover, the software is preferably implemented as an application program tangibly embodied on a program storage unit or non-transitory computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for detection of common patterns within unstructured data elements, comprising:
  extracting a plurality of unstructured data elements retrieved from a plurality of big data sources;
  generating, by a signature generator system, at least one signature for each of the plurality of unstructured data elements, wherein the signature generator system includes a plurality of computational cores configured to receive the plurality of unstructured data elements, each computational core of the plurality of computational cores having properties that are at least partly statistically independent of other of the computational cores, the properties are set independently of each other core;
  identifying common patterns among the generated signatures;
  clustering the signatures identified to have common patterns; and
  correlating the generated clusters to identify associations between their respective identified common patterns.

2. The method of claim 1, further comprising:
re-clustering clusters having association between their respective common patterns to create a common concept.

3. The method of claim 2, further comprising:
storing in a database at least one of the common concept, the generated signatures, the clusters, and the identified common patterns.

4. The method of claim 1, wherein the extracted unstructured data elements are of specific interest, or otherwise of higher interest than other elements comprised in a collected unstructured data.

5. The method of claim 1, wherein each of the at least one generated signature is robust to noise and distortion.

6. The method of claim 1, wherein the plurality of unstructured data elements unstructured data elements are retrieved from the plurality of big data sources having a similar classification.

7. The method of claim 1, wherein each of the plurality of unstructured data elements is at least one of: a multimedia content, a book, a document, metadata, a collection of health records, audio, video, analog data, a file, unstructured text, and a web page.

8. The method of claim 1, wherein identifying the common patterns further comprises:
matching the generated signatures to each other;
assigning a matching score for each two matched signatures;
comparing the matching score to a preconfigured threshold; and
determining the two signatures to have the common pattern when their respective matching score is greater than the preconfigured threshold.

9. The method of claim 1, wherein the correlating of the generated clusters further comprises:
determining for each at least two clusters of the generated clusters if they contain a preconfigured number of matching signatures.

10. A non-transitory computer readable medium having stored thereon instructions for causing one or more processing units to execute the method according to claim 1.

11. A system for analyzing unstructured data, comprising:
a network interface for allowing connectivity to a plurality of big data sources;
a signature generator system;
a processor; and
a memory connected to the processor, the memory contains instructions that when executed by the processor, configure the system to:
extract a plurality of unstructured data elements retrieved from a plurality of big data sources;
generate by the signature generator system at least one signature for each of the plurality of unstructured data elements, wherein the signature generator system includes a plurality of computational cores enabled to receive the plurality of unstructured data elements, each computational core of the plurality of computational cores having properties that are at least partly statistically independent of other of the computational cores, the properties are set independently of each other core;
identify common patterns among the generated signatures;
cluster the signatures identified to have common patterns; and
correlate the generated clusters to identify associations between their respective identified common patterns.

12. The system of claim 11, wherein the system is further configured to re-cluster clusters having association between their respective common patterns to create a common concept.

13. The system of claim 12, wherein the system further comprises a database for storage of the common concept, the generated signatures, the clusters, and the identified common patterns.

14. The system of claim 11, wherein the extracted unstructured data elements are of specific interest, or otherwise of higher interest than other elements comprised in a collected unstructured data.

15. The system of claim 11, wherein the plurality of unstructured data elements are retrieved from the plurality of big data sources having a similar classification.

16. The system of claim 11, wherein each of the plurality of unstructured data elements is at least one of: a multimedia content, a book, a document, metadata, a collection of health records, audio, video, analog data, a file, unstructured text, and a web page.

17. The system of claim 11, wherein the each of the at least one generated signature is robust to noise and distortion.

18. The system of claim 11, wherein the system is further configured to:
match the generated signatures to each other;
assign a matching score for each of two matched signatures;
compare the matching score to a preconfigured threshold; and
determine the two signatures to have the common pattern when their respective matching score is greater than the preconfigured threshold.

19. The system of claim 11, wherein the system is further configured to determine for each at least two clusters of the generated clusters if they contain a preconfigured number of matching signatures.

* * * * *